Figure 1:
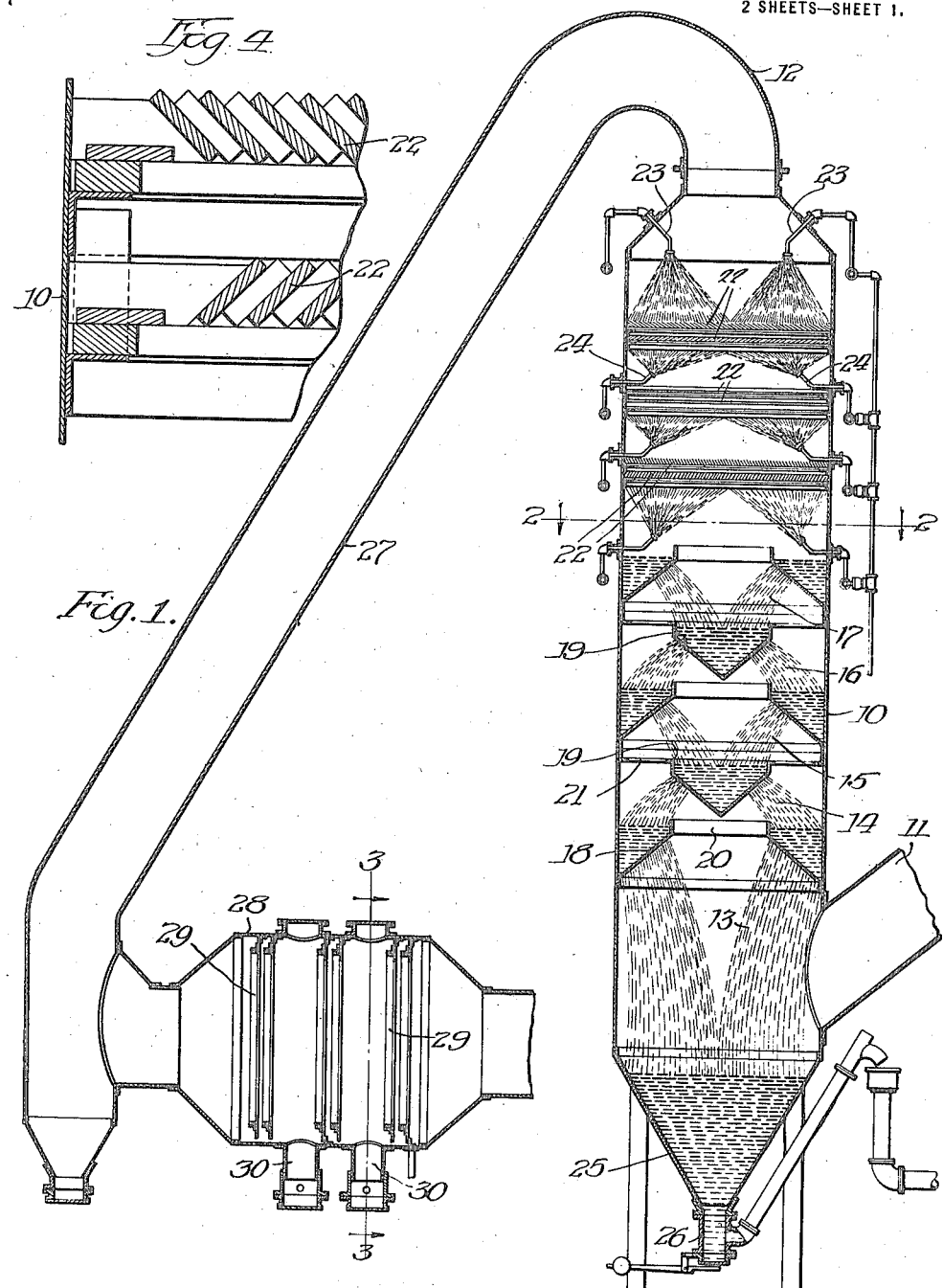

H. A. BRASSERT.
METHOD OF GAS WASHING.
APPLICATION FILED JUNE 28, 1915.

1,169,764.

Patented Feb. 1, 1916.
2 SHEETS—SHEET 2.

Witnesses:

Inventor:
Hermann A. Brassert

UNITED STATES PATENT OFFICE.

HERMANN A. BRASSERT, OF CHICAGO, ILLINOIS.

METHOD OF GAS-WASHING.

1,169,764. Specification of Letters Patent. Patented Feb. 1, 1916.

Application filed June 28, 1915. Serial No. 36,818.

*To all whom it may concern:*

Be it known that I, HERMANN A. BRASSERT, a citizen of the United States, and resident of Chicago, in the county of Cook and State of Illinois, have invented certain new and useful Improvements in Methods of Gas-Washing, of which the following is a specification.

I have found that the washing of blast furnace gas should properly consist of three distinct and fundamentally differing stages, and the principle of my invention is to carry on these stages in combination, each in the most economical manner.

The first stage consists of thoroughly wetting every part of the gas, which can be done by any method of spraying which insures a good mixture of gas and water. In this stage the gas is cooled and the fine ore dust suspended therein is precipitated in the water. However, to accomplish this efficiently, the counter-current principle must be employed, the hot, dirty gas entering the apparatus at the bottom and meeting there the warm, heated and dust-laden discharge water; the washed gas leaving at the top and meeting last the entering cold water. By this method the smallest amount of water is required to fulfil the purpose. The apparatus performing this stage of the process must be so designed that the large amount of heavy dust precipitated does not clog any part of it. Therefore, narrow gas passages must be avoided, and for that reason it is not possible to attain a high degree of cleanliness in this, the first stage of the process.

The second stage consists of washing out the more finely divided matter contained in the gas, consisting of lime, magnesia and silica in a finely divided state and carried in suspension, and the remainder of the finest particles of iron oxid. To accomplish this it is necessary to more finely subdivide the gas and water, bringing them into more intimate contact with each other than is necessary or possible in the first stage in the presence of so much heavy dust. This second stage of the cleaning is sometimes performed by mechanical washers, which, however, require considerable power and are costly to operate. The existing stationary towers are not capable of removing the finest particles of dust, as gas and water do not come into sufficiently intimate contact therein. I have found, however, that the same results as in rotary washers can be achieved at a much lower cost by utilizing the inertia of the moving gas, compelling it to strike with force against a large number of oblique surfaces. The wet gas then deposits a film of the finest materials on these surfaces.

While it is not new to employ baffle vanes in a washer against which the gas is forced to strike, such vanes have heretofore either been placed parallel to the flow of the gas, in order to prevent clogging, or they have been placed in a vertical position, the gas flowing through them horizontally so that adhesions on both sides could be easily washed down; this method is very wasteful of water, as the water from each spray is only used once and immediately leaves the path of the gas. Parallel vanes, such as are placed in the well known Zschocke towers, are not capable of catching the finest particles contained in the gas, because the gas does not strike against their larger surfaces with sufficient force, but merely flows by them; the purpose of the baffles or hurdles in these towers being more to divide and distribute the gas and water than to cause a forced contact with their surfaces. Such towers, as well as various other designs of spray or baffle towers, only fulfil the requirements of what I term the first stage of gas washing.

The difficulty has been to find a method which would finely divide the gas, and in spite of narrowing its passages and restricting its flow, would keep the apparatus open and free from clogging during operation, and to do this without using an excessive amount of water. I accomplish this by applying the second stage in conjunction with the first stage above described, applying the counter-current principle to the second stage as well as to the first stage, and using only the waste water from the second stage for the washing in the first stage. In this manner I use the minimum amount of water for the combined first and second stages, and still have sufficient water to apply to the baffles in the second stage to keep them clean.

By dealing with cleaner water and cleaner gas in the second stage, it becomes practicable there to divide the gas into innumerable narrow passages in which it is forcefully thrown against oblique surfaces, without the danger of clogging up their passages, which would exist were such restricted areas used in the first stage.

I have recognized that to make gas washing efficient every drop of water applied to the process must be used over and over again, being arrested and retarded in its path as often as possible, breaking up, reforming and meeting new particles of gas, until finally it has taken up the maximum amount of temperature and dust from the gas. I, therefore, do not allow any portion of the water applied at the top of the second stage to leave the process except at the entrance of the gas into the first stage.

The third stage consists of drying the gas. I have found that for this stage the opposite system gives the best results, viz: the water formed on the baffles should leave the path of the gas as quickly as possible. Efficient drying is not possible in a vertical tower because the deposited water remains in the path of the oncoming gas and is carried upward with it. I, therefore, place the drying elements in a horizontal casing where the water is cooled on each set of baffles, then allowed to run down and immediately escape from the path of the gas and leave the apparatus.

Many forms of apparatus can be designed to embody these broad principles of efficient gas cleaning. I prefer to use a cylindrical, vertical tower for the first two stages, in which the first stage consists of a series of perforated trays, such as is shown in use in the Brassert-Bacon gas washing Patent No. 1,123,232. The second stage is arranged immediately above these trays and consists of wooden slats placed at different angles to the flow of the gas and arranged in tiers. These slats are separated by larger spaces in the lower rows and closer spaces in the upper rows and are staggered in successive rows against each other so as to cause a change in the direction of the flow of the gas between each two successive sets. One or more rows may form a set, but each set is placed at right angles to the next one. The closely spaced slats in the top rows as compared to the bottom rows correspond to the difference in temperature of the gas at the bottom and at the top of the second stage. I also prefer to give the bottom rows less incline from the vertical axis than the top rows, so as to assist in keeping the lower rows clean, where more dirt is liable to collect than at the top. These vanes, or slats, are washed by a number of sprays from above or below, or both, those above preferably being in constant use, while those below are only turned on at regular intervals to wash out any accumulation on the inside of the vanes.

The top rows I preferably make movable, so that at regular intervals they can be swung 90 degrees around a pivot, thus exposing their reverse surfaces to the gas and water. By this means the space between the slats can be kept absolutely clean with the use of a minimum amount of water, and a better distribution of gas and water is thereby assured. This arrangement also offers the advantage of allowing the total cross section of gas passage to be increased or decreased at will, and thereby regulates the gas pressure as well as the velocity of flow. Other means besides counter sprays and reversible slats may be employed for the same purpose of cleaning the vanes or slats. For instance, the slats may be cleaned by shaking or by reversing the flow of both gas and water.

The slats I preferably make out of rough pine wood, as this material offers a rougher surface to which the fine particles will cling more readily than to smoother surfaces, such as metal. The wood has the advantage of a longer life in contact with water than metals.

For the third or drying stage I preferably employ a cylindrical casing into which the gas enters in a horizontal direction at one end and flows through vertical sets of wooden baffles which are similarly spaced as those employed in the second stage, but which are not sprayed with water except at intervals when it is necessary to flush them out, for which purpose sprays or suitable nozzles are so placed as to cover the slats. The water entrained in the gas which collects on the slats trickles down on them, thus leaving the path of the gas, and is collected at the bottom of the casing in several cones attached to which is a gas seal which permits the water to continually drain from the drier without allowing any gas to escape. The angle of these cones is such that no dirt can collect on them, and that the minimum surface of water is exposed to the gas.

The invention will be more readily understood by reference to the accompanying drawings, wherein—

Figure 2:
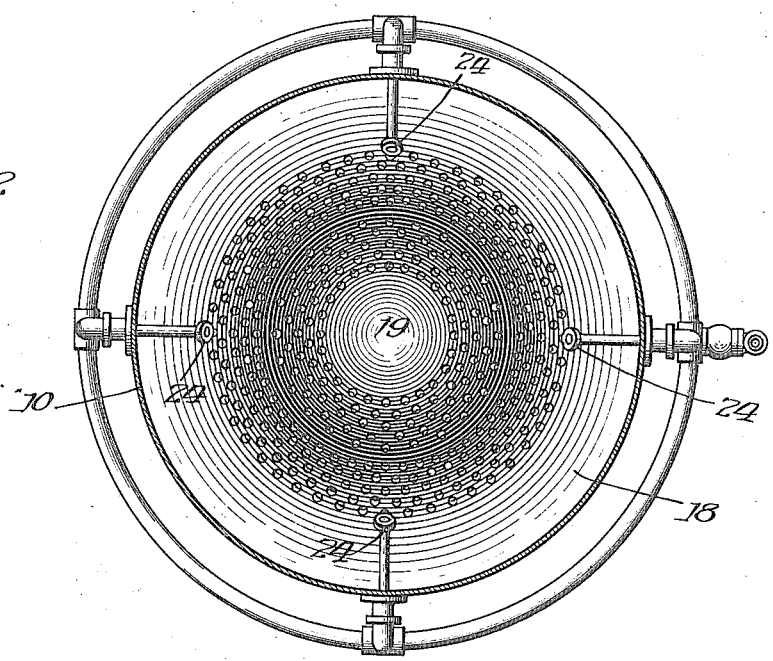
Figure 3:
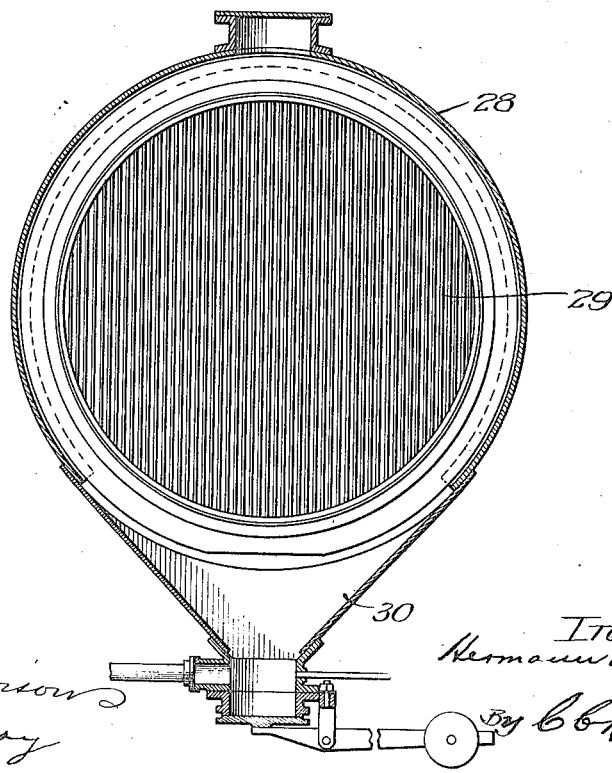

Figure 1 is a vertical section of a gas washing plant such as is contemplated by me; Fig. 2 is a section on the line 2—2 of Fig. 1; Fig. 3 is a section on the line 3—3 of Fig. 1, and Fig. 4 is an enlarged fragmentary section of a portion of the baffles constituting the one section thereof.

Referring more particularly to the drawings, it will be seen that I provide a shell or casing 10, within which the first and second stages of the washing operation are completed.

It will be understood, of course, that the construction shown in Fig. 1 is very much reduced in size and that the top of the casing has an elevation of substantially 60 feet above the ground.

A gas inlet 11 and an outlet 12 are provided, the inlet being at the lower portion of the casing.

As heretofore stated, my invention contemplates the provision of means for thoroughly wetting or saturating the gas with water immediately upon its entrance into the washer and thereby to remove from the gas the heavier particles which are carried in suspension. In the apparatus shown, the gas, after entering the casing, is forced to pass through a sheet of water 13, and as this stage is intended to provide only for rough washing, the water utilized is that which has passed through the washer from the top and is hot and dirty and contains the dust which it has taken up in the prior washing stages. It is impossible for the gas to enter the casing without becoming completely saturated, and, furthermore, it is impossible for the gas to rise in the casing without passing through successive sheets of water, such as indicated at 14, 15, 16 and 17. The washer is composed of trays 18, 19, providing alternate axial openings 20 and peripheral openings 21. In the trays 18 the water is collected near the periphery and escapes through openings, the flow of the water being toward the center of the casing. In the trays 19 the water is collected at the axial center thereof and escapes through side openings, the flow of water being toward the periphery of the casing and into the trays 18. Thus it will be seen that the gas in passing upwardly through the first stage must traverse successive sheets or streams of water and while the gas is not restricted in its passage and no small openings are provided therefor, yet the gas is thoroughly washed of all of its heavier particles of solid matter. After the gas leaves the uppermost of the trays it contacts with a series of inclined baffles 22, each course of which baffles may be set at right angles to the preceding course. I intend also that the lower baffles shall be spaced a greater distance apart than the upper baffles, this spacing being arranged substantially in accordance with the temperatures of the gas at the different points in the height of the washer, this for the reason that as the gas is cooled and is freed of its dust it is possible to cause the passage of the same through openings of smaller size without retarding the velocity of the gas or clogging the openings with accumulations. I prefer also to set the upper series of baffles at a more acute incline than those constituting the lower series. This is clearly shown in Fig. 1, and is done for the same reason as described in connection with the closer spacing of the baffles.

The water is supplied at the upper end of the casing through the nozzles 23, and, if preferred, other nozzles 24 may be provided for spraying the under surface of the baffles. This water, as will be seen, enters the casing at the top, assists in a multitude of washing operations and finally arrives at the lower portion of the casing where it meets the entering gas. A seal is provided at the pointed lower end 25 of the casing, and a trap 26 permits of cleaning the accumulated mud from the casing.

After leaving the casing at the outlet 12, the gas carries much water in suspension. The gas is then conveyed by the pipe 27 to the drier which is constructed on just the opposite principle to that of the washer. This drier consists of a casing 28, in which a large number of vertically disposed baffles 29 are located. These baffles are arranged diagonally and cause an intimate contact of the moisture-laden gas with the surfaces thereof, and inasmuch as the gas has considerable velocity, the impact of the gas against the baffles causes the deposition of the water and it immediately leaves the path of the gas by trickling down to the lower portion of the casing and into the traps 30. The object in the construction of the drier is to provide means whereby the water may escape from the path of the gas as quickly as possible in contradistinction to the washer in which the water is not permitted to leave the path of the gas until it has been utilized to the fullest extent.

While the form of apparatus above described fulfils all the purposes of my invention, other means may be employed without deviating from the broad method of gas washing in distinct successive stages which I claim as my invention.

I claim:

1. The method of washing gas, which consists in passing the gas through falling streams of water, whereby the coarser particles of solid matter are removed, then causing the gas to impinge against angularly disposed baffles, causing water to flow over the surfaces of said baffles, the gas being caused to travel in a vertical direction, whereby a unit of washing water is repeatedly brought into contact with the gas, and then drying the gas, substantially as described.

2. The method of washing gas, which consists in passing the same vertically through a tower, said gas in its passage through the first portion of the tower being caused to follow a tortuous course and to be opposed in its passage through that section only by falling streams of water, then causing the gas to impinge against angularly disposed deflectors, the surfaces of which are sprayed with water, then drying the gas, substantially as described.

3. The method of washing and drying gas in three stages, which consists first in passing the gas through a heavy rain of water whereby the coarser particles of dust are removed, together with the sensible heat of the gas, and then subjecting the gas to a finely divided spray or mist, simultaneously impinging it against diagonally disposed baffles, the gas traveling upward in a substantially vertical direction and the water falling downwardly against the gas, whereby each unit of washing water is repeatedly brought into contact with each unit of gas then drying the gas, substantially as described.

4. The method of washing and drying gas in three stages, which consists in first passing the gas through a heavy rain; second, through a finely divided spray, simultaneously impinging it against baffles; and third, passing it through drying baffles against which the gas impinges and which are so arranged that the water deposited thereon will immediately leave the path of the gas, substantially as described.

5. The method of washing and drying gas in three stages, which consists in first passing the gas vertically through a coarse spray; second, vertically through a fine spray, simultaneously impinging it against baffles; and third, passing it horizontally through drying baffles which will catch the entrained water and conduct it out of the path of the gas, substantially as described.

Signed at Chicago, Illinois, this 14th day of June, 1915.

HERMANN A. BRASSERT.

Witnesses:
B. F. MOHR,
W. E. DANIELS.